United States Patent
Lo et al.

(10) Patent No.: US 10,050,461 B2
(45) Date of Patent: Aug. 14, 2018

(54) CHARGE CONTROL CIRCUIT, CHARGE CONTROL METHOD AND ASSOCIATED POWER MANAGEMENT INTEGRATED CIRCUIT

(71) Applicant: MEDIATEK INC., Hsin-Chu (TW)

(72) Inventors: Kuo-Chang Lo, Taipei (TW); Chuan-Chang Lee, Hsinchu County (TW)

(73) Assignee: MediaTek Inc., Hsin-Chu (TW)

( * ) Notice: Subject to any disclaimer, the term of this patent is extended or adjusted under 35 U.S.C. 154(b) by 257 days.

(21) Appl. No.: 14/922,217

(22) Filed: Oct. 26, 2015

(65) Prior Publication Data
US 2016/0233714 A1 Aug. 11, 2016

Related U.S. Application Data

(60) Provisional application No. 62/115,124, filed on Feb. 11, 2015.

(51) Int. Cl.
*H02J 7/00* (2006.01)

(52) U.S. Cl.
CPC .......... *H02J 7/0091* (2013.01); *H02J 7/0052* (2013.01)

(58) Field of Classification Search
CPC ..................................................... H02J 7/0091
USPC ....................................................... 320/152
See application file for complete search history.

(56) References Cited

U.S. PATENT DOCUMENTS

| 5,945,803 A | 8/1999 | Brotto | |
|---|---|---|---|
| 2001/0001533 A1* | 5/2001 | Stuck Andersen ... | H01M 10/44 320/150 |
| 2004/0145352 A1* | 7/2004 | Harrison ............... | H02J 7/0029 320/150 |
| 2007/0126405 A1* | 6/2007 | Kao ....................... | H02J 7/0029 320/150 |
| 2011/0121789 A1* | 5/2011 | Yang ..................... | H02J 7/0026 320/152 |
| 2013/0293186 A1* | 11/2013 | Chou .................... | H02J 7/0091 320/107 |

FOREIGN PATENT DOCUMENTS

| JP | H07284235 A | 10/1995 |
|---|---|---|
| JP | 2002199606 A | 7/2002 |
| JP | 2006129540 A | 5/2006 |
| JP | 201022118 A | 1/2010 |

* cited by examiner

*Primary Examiner* — Yalkew Fantu
(74) *Attorney, Agent, or Firm* — Wolf, Greenfield & Sacks, P.C.

(57) ABSTRACT

A charge control circuit includes an analog to digital converter (ADC) and a control unit, wherein the ADC is arranged for monitoring a temperature of a battery and converting the monitored temperature to a digital value; and the control unit is coupled to the analog to digital converter, and is arranged for determining whether to generate a control signal to adjust a charge current or a charging voltage of a battery or not according to the digital value, and the ADC and the control unit are fully hardware architectures.

14 Claims, 4 Drawing Sheets

CHARGE CONTROL CIRCUIT, CHARGE CONTROL METHOD AND ASSOCIATED POWER MANAGEMENT INTEGRATED CIRCUIT

CROSS REFERENCE TO RELATED APPLICATIONS

This application claims the priority of U.S. Provisional Application No. 62/115,124, filed on Feb. 11, 2015, which is included herein by reference in its entirety.

BACKGROUND

Lithium-ion (Li-ion) batteries tend to become dangerous when they are charged by high charge voltage and charge current at high temperatures. Therefore, the Japan Electronics and Information Technology Industries Association (JEITA) standard addresses safety requirements and battery-charger solutions to avoid the human safety risk.

In the JEITA standard, the charge voltage and charge current need to be decreased at high temperatures or low temperatures. In the conventional art, analog comparators or software solutions are used to adjust the charge voltage and charge current at high/low temperatures. However, the analog comparators need too much die area, and the temperature threshold settings are not flexible; and the software solutions still have risk if the software hangs up at high/low temperatures.

SUMMARY

It is therefore an objective of the present invention to provide a charge control circuit, charge control method and associated power management integrated circuit, to solve the above-mentioned problems.

According to one embodiment of the present invention, a charge control circuit comprises an analog to digital converter (ADC) and a control unit, wherein the ADC is arranged for monitoring a temperature of a battery and converting the monitored temperature to a digital value; and the control unit is coupled to the analog to digital converter, and is arranged for determining whether to generate a control signal to adjust a charge current or a charging voltage of a battery or not according to the digital value, and the ADC and the control unit are fully hardware architectures.

According to another embodiment of the present invention, a power management integrated circuit comprises an analog to digital converter (ADC) and a control unit, wherein the ADC is arranged for monitoring a temperature of a battery and converting the monitored temperature to a digital value; and the control unit is coupled to the analog to digital converter, and is arranged for determining whether to generate a control signal to adjust a charge current or a charging voltage of a battery or not according to the digital value.

According to another embodiment of the present invention, a charge control method comprises: using a fully hardware architectures to: monitor a temperature of a battery and perform an analog to digital converting operation upon the monitored temperature to a digital value; and determine whether to generate a control signal to adjust a charge current or a charge voltage of a battery or not according to the digital value.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and claims to refer to particular system components. As one skilled in the art will appreciate, manufacturers may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . " The terms "couple" and "couples" are intended to mean either an indirect or a direct electrical connection. Thus, if a first device couples to a second device, that connection may be through a direct electrical connection, or through an indirect electrical connection via other devices and connections.

Figure 1:
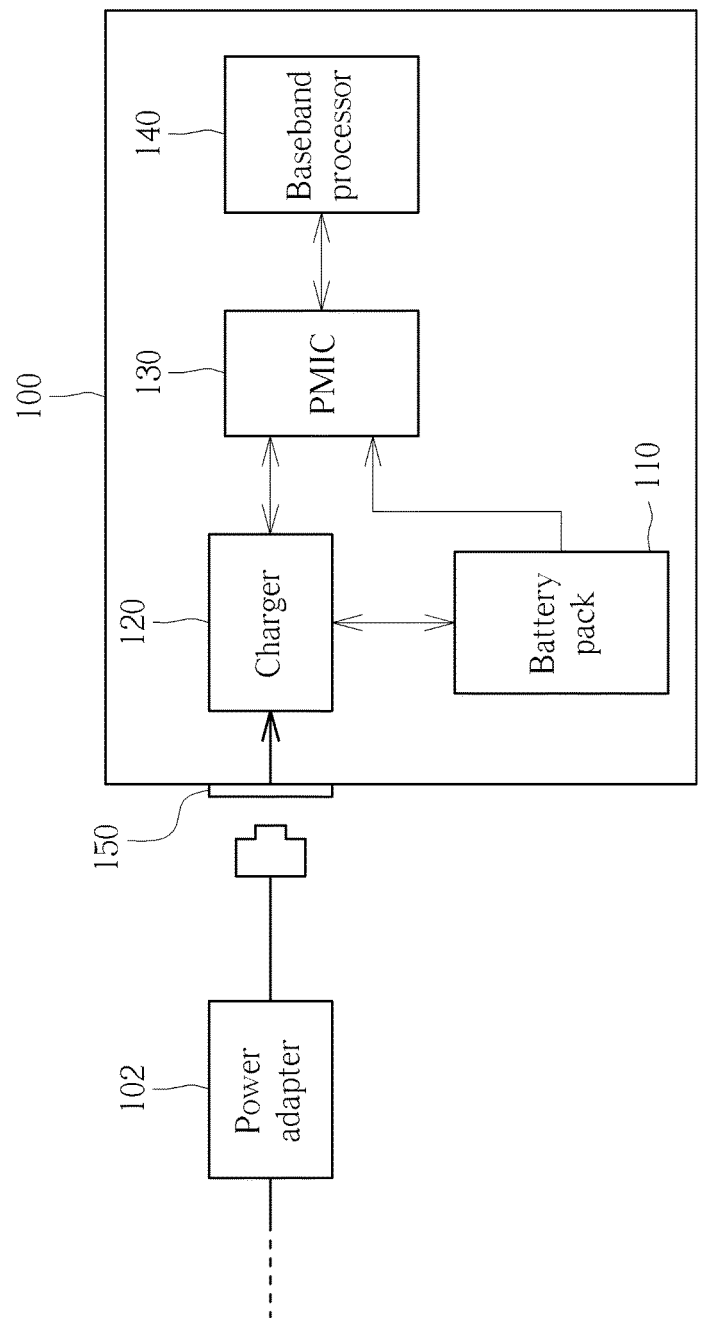
FIG. 1, which is a diagram illustrating an electronic device according to one embodiment of the present invention.

Please refer to FIG. 1, which is a diagram illustrating an electronic device 100 according to one embodiment of the present invention. As shown in FIG. 1, the electronic device 100 comprises a battery pack 110, a charger 120, a power management integrated circuit (PMIC) 130, a baseband processor 140 and a connector 150, wherein the connector is arranged to connected to a connector of a power adapter 102 for charging the battery pack 110 of the electronic device 100. In addition, in this embodiment, the electronic device 100 may be a mobile phone, tablet, notebook, or any other portable device having a battery pack; and the battery pack 110 may be a Lithium-ion battery pack.

In this embodiment, the baseband processor 140 or other memory circuit of the electronic device 100 may record temperature thresholds setting, and this temperature thresholds setting are programmable. In addition, the temperature thresholds setting may comprise a plurality of threshold values corresponding to a plurality of temperatures.

Figure 2:
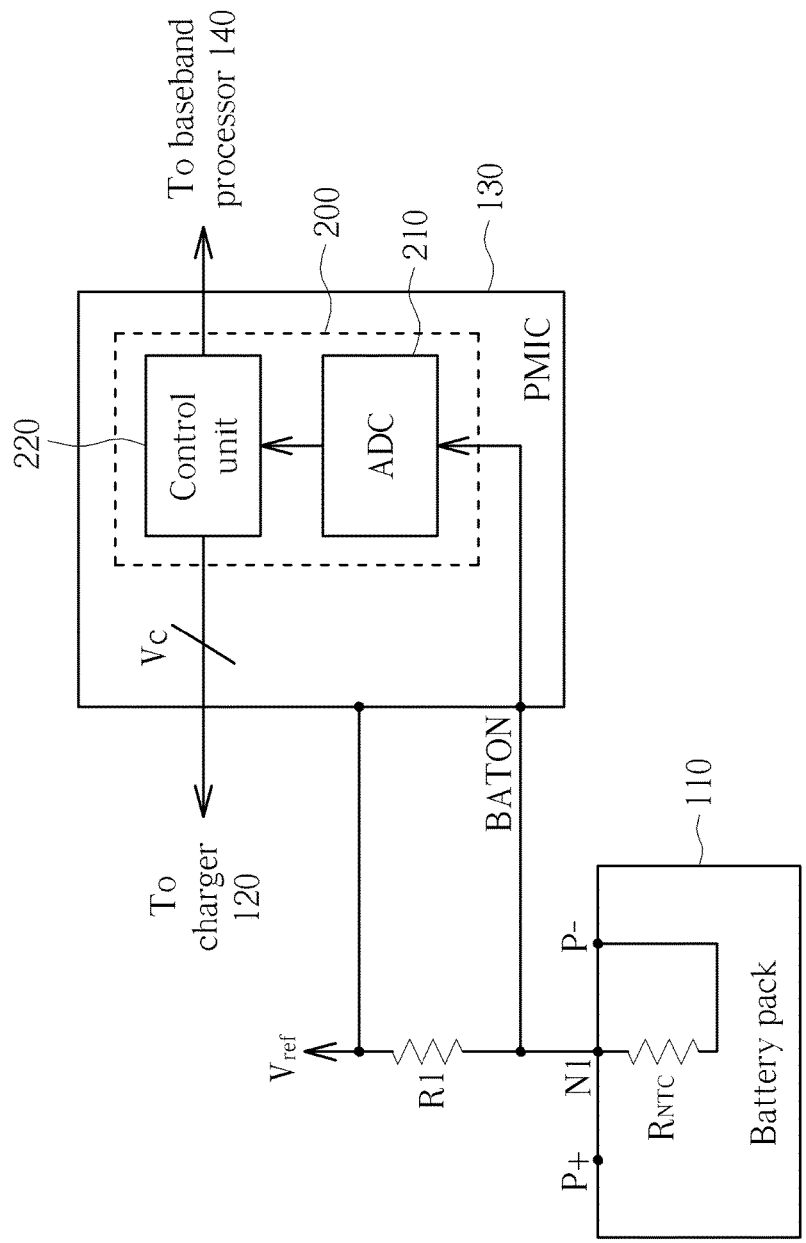
FIG. 2 is a diagram illustrating detailed architectures of the battery pack and the PMIC according to one embodiment of the present invention.

Please refer to FIG. 2, which is a diagram illustrating detailed architectures of the battery pack 110 and the PMIC 130 according to one embodiment of the present invention. In FIG. 2, the battery pack 110 comprises at least terminals P+, P− and N1, wherein the terminals P+ and P− are connected to the charger 120 to receive the charge voltages, and the terminal N1 is connected to a negative temperature coefficient (NTC) thermistor $R_{NTC}$ of the battery pack 110, a resistor R1 and a battery-on (BATON) terminal of the PMIC 130. The PMIC 130 includes a charge control circuit 200, and the charge control circuit 200 comprises an analog to digital converter (ADC) 210 and a control unit 220. In addition, the ADC 210 and the control unit 220 are fully hardware architectures, and the control unit 220 is operated in a digital domain. It is noted that FIG. 2 merely shows the elements related to the present invention, a person skilled in the art should understand that the battery pack 110 and PMIC 130 have other terminals and elements.

In this embodiment, the charger 120, the PMIC 130 and the baseband processor 140 are different chips. In other embodiments, however, the charger 120 may be integrated into the PMIC 130, or the charge control circuit 200 may be positioned in the charger 120. These alternative designs shall fall within the scope of the present invention.

In this embodiment, the ADC 210 may have 12-bit resolution, and each threshold value of the temperature thresholds setting may be 12 bits. Therefore, the engineer may free to set the desired threshold values of the temperature threshold setting.

In the operations of the elements shown in FIG. 1 and FIG. 2, when the power adapter 102 is connected to the connector 150, the baseband processor 140 (software) executes the initial setting, e.g. set a parameter HW_JEITA=1 and set the threshold values of temperature threshold setting and associated charge voltages/currents, and the charger 120 starts to generate a charge voltage and a charge current to the battery pack 110 to charge the battery pack 110 according to a voltage/current from the connector 150, and the charge control circuit 200 loads the threshold values of the temperature threshold setting. During the charger 120 charges the battery pack 110, the ADC 210 monitors a temperature of the battery pack 110 by measuring a voltage level of the BATON terminal of the PMIC 130, and converts the monitored temperature (i.e. the voltage level of the BATON terminal) to a digital value. As shown in FIG. 2, because the resistance of the NTC thermistor $R_{NTC}$ is varied with the temperature, the voltage level of the BATON terminal, that is $Vref*(R_{NTC}/(R1+R_{NTC}))$, can reflect the temperature of the battery pack 110. Then, the control unit 220 determines whether to generate at least one control signal Vc to the charger 120 to adjust a charge current or a charging voltage of a battery or not according to the digital value and the threshold values of the temperature threshold setting. In detail, the threshold values may define a plurality of temperature ranges, and each temperature range corresponds to a charge voltage or a charge current, and the control unit 220 may determine a specific temperature range that the battery pack 110 is within, and send the control signal Vc to the charger 120 to use the corresponding charge voltage/current to charge the battery pack 110.

In one embodiment, the ADC 210 may read the voltage level of the BATON terminal periodically (e.g. every second), and the ADC 210 reads the voltage level of the BATON terminal a plurality of times (e.g. 10 times) to generate a plurality of digital values, respectively, and the control unit 220 generates the control signal Vc to reset/adjust the charge current and the charge voltage of the battery pack 110 only when all digital values are greater than one of the threshold values or all the digital values are smaller than one of the threshold values.

In addition, if the charge voltage or the charge current is changed, the control unit 220 will notify the baseband processor 140.

Figure 3:
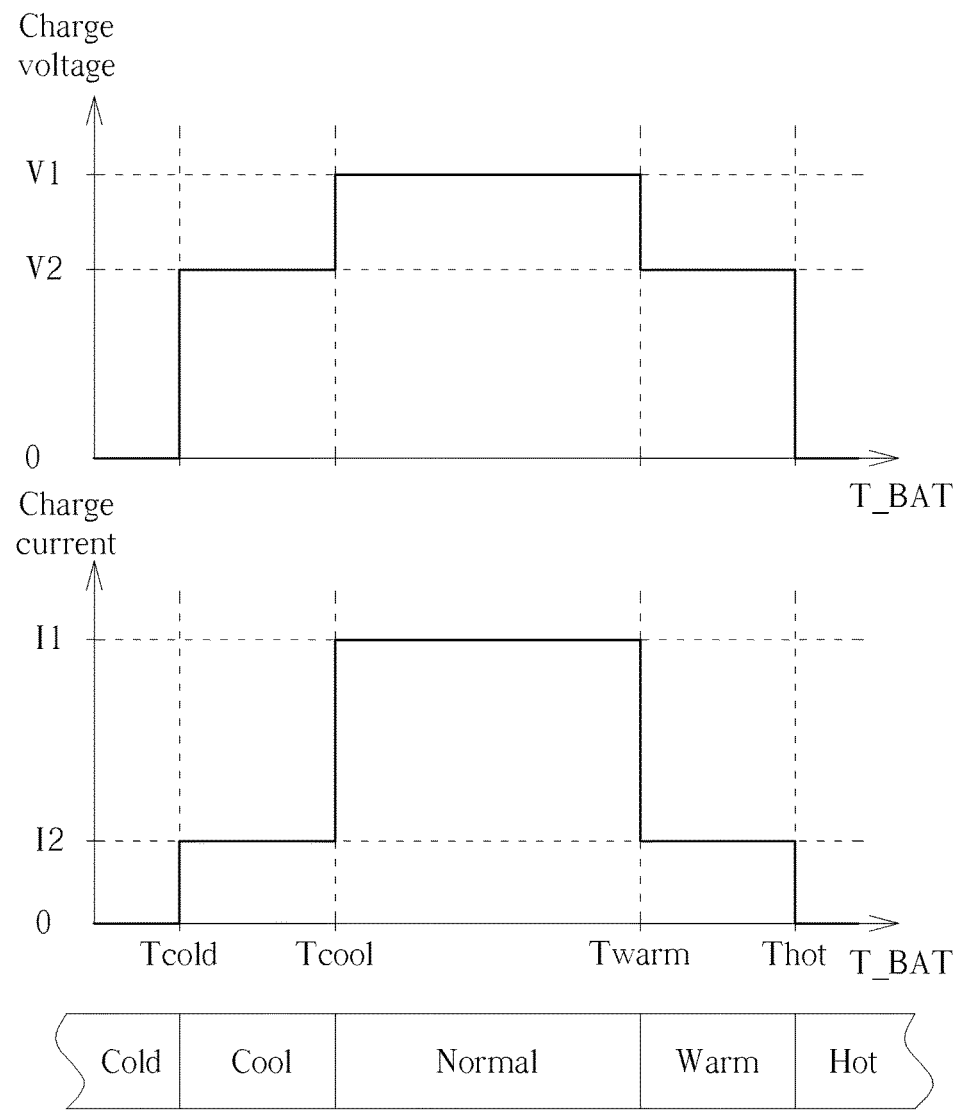
FIG. 3, which is a diagram illustrating the threshold values of the temperature threshold setting and corresponding charge voltage and charge current according to one embodiment of the present invention.

Please refer to FIG. 3, which is a diagram illustrating the threshold values of the temperature threshold setting and corresponding charge voltage and charge current according to one embodiment of the present invention. In FIG. 3, there are three charge voltage levels V1, V2 and 0, three charge current levels I1, I2 and 0, four threshold values Tcold, Tcool, Twarm and Thot, and five temperature ranges: "cold", "cool", "normal", "warm" and "hot", where in this embodiment, V1=4.2 V, V2=4.1 V, I1=600 mA, I2=200 mA, and the threshold values Tcold, Tcool, Twarm and Thot correspond to −10° C., 10° C., 45° C. and 60° C., respectively. However, the above-mentioned arrangement for FIG. 3 is for illustrative purposes only, not a limitation of the present invention.

Refer to FIGS. 1-3 together, when the control unit 220 determines that the digital value outputted by the ADC 210 is between the threshold values Tcool and Twarm, the charger 120 uses the charge voltage V1 and the charge current I1 to charge the battery pack 110. When the control unit 220 determines that the digital value outputted by the ADC 210 is between the threshold values Tcold and Tcool, or between the threshold values Twarm and Thot, the control unit 220 generates the control signal Vc to the charger 120 to use the charge voltage V2 and the charge current I2 to charge the battery pack 110. In addition, when the control unit 220 determines that the digital value outputted by the ADC 210 is greater than the threshold value Thot or lower than the threshold value Tcold, the control unit 220 generates the control signal Vc to the charger 120 to stop charging the battery pack 110 (i.e. both the charge voltage and charge current are zero).

Figure 4:
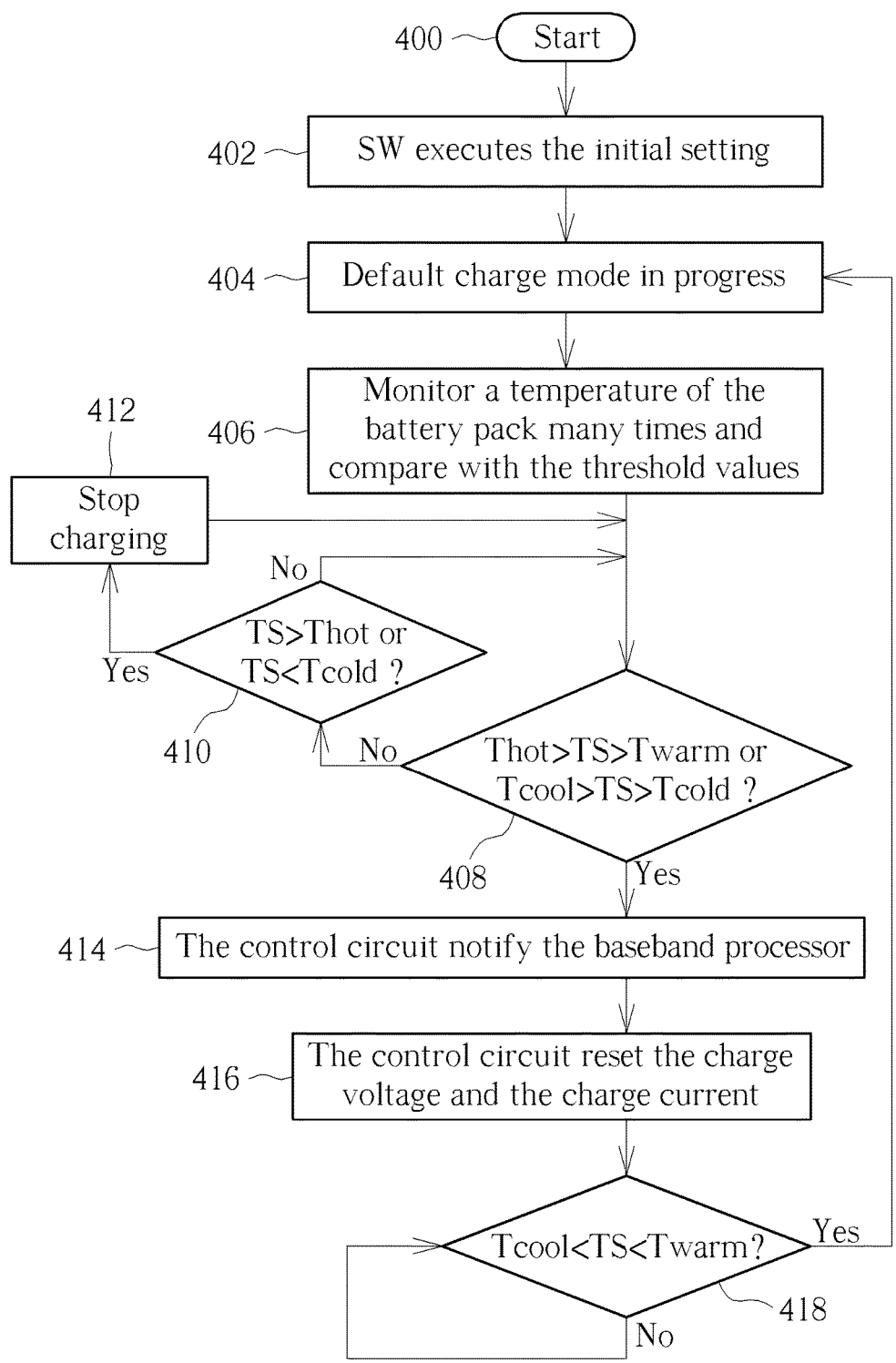
FIG. 4 is a diagram illustrating a charge control method according to one embodiment of the present invention.

Please refer to FIG. 4, which is a diagram illustrating a charge control method according to one embodiment of the present invention. Refer to FIGS. 1-4 together, the flow is described as follows.

Step 400: the flow starts.

Step 402: the baseband processor 140 (software) executes the initial setting, e.g. set a parameter HW_JEITA=1 and set the threshold values Tcold, Tcool, Twarm and Thot, and the charge voltages V1 and V2, and the charge current I1 and I2 mentioned above.

Step 404: the charger 120 uses a default charge mode to charge the battery pack 110, wherein the default charge mode correspond to the charge voltage V1 and charge current I1.

Step 406: Monitor a temperature of the battery pack 110 many times and compare with the threshold values.

Step 408: the control unit 220 determines whether the monitored temperature (TS) is between the threshold values Thot and Twarm, or between the threshold values Tcold and Tcool. If yes, the flow enters Step 414; if not, the flow enters Step 410.

Step 410: the control unit 220 determines whether the monitored temperature (TS) is greater than the threshold value Thot or lower than the threshold value Tcold. If yes, the flow enters Step 412; if not, the flow enters Step 408.

Step 412: the control unit 220 generates the control signal Vc to the charger 120 to stop charging the battery pack 110.

Step 414: the control unit 220 notifies the baseband processor 140 by sending an interrupt flag.

Step 416: the control unit 220 generates the control signal Vc to the charger 120 to reset/adjust the charge voltage and the charge current, that is to use the charge voltage V2 and the charge current I2 to charge the battery pack 110.

Step 418: the control unit 220 determines whether the current monitored temperature (TS) is between the threshold values Tcool and Twarm. If yes, the flow goes back to Step 404 to use the default charge mode; if not, the flow stays in Step 418.

In the flowchart shown in FIG. 4, once baseband processor 140 detects that the power adapter 102 is inserted, software will execute charger related initial setting (e.g. charge current/charge voltage threshold and HW_JEITA etc) into the charge control circuit 200 within the charger 120 or within the PMIC 130. Then, the charging behavior is hardware auto control (charger 120 or PMIC 130) and the BATON voltage is periodically monitored to do JETIA protection. If triggering the JEITA protection, the charger 120 or the PMIC 130 will send interrupt flag to baseband processor 140 to update charger state.

Briefly summarized, in the charge control circuit, charge control method and associated power management integrated circuit of the present invention, the charge voltage and charge current control steps are performed in digital domain, and no analog comparator is used in the charge control circuit to save the die area and to lower the manufacturing cost. In addition, in the present invention, all the main operations are performed by hardware to prevent the possible risk when the software hangs up.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A charge control circuit, comprising:
   an analog to digital converter (ADC), arranged for monitoring a temperature of a battery and converting the monitored temperature to a digital value; and
   a control unit, coupled to the analog to digital converter, arranged for determining whether to generate a control signal to adjust a charge current or a charging voltage of a battery or not according to the digital value;
   wherein the ADC and the control unit are fully hardware architectures,
   wherein the charge control circuit is arranged such that, when the battery starts to be charged, a plurality of threshold values are loaded,
   wherein the control unit is arranged for determining whether to generate the control signal or not by comparing the digital value with at least one of the threshold values, and
   wherein the ADC is arranged for monitoring the temperature of the battery a plurality of times to generate a plurality of digital values, respectively, and the control unit is further arranged for generating the control signal to adjust the charge current or the charge voltage of the battery in response to determining that all digital values are greater than one of the threshold values or that all the digital values are smaller than one of the threshold values.

2. The charge control circuit of claim 1, wherein the ADC is arranged for monitoring the battery temperature by measuring a voltage level of a terminal, and the terminal is arranged for connecting to a negative temperature coefficient (NTC) thermistor of the battery.

3. The charge control circuit of claim 1, wherein the control unit is arranged such that, when the control unit determines to generate the control signal to adjust the charge current or the charge voltage of the battery, a signal to notify a processor is sent.

4. A power management integrated circuit, comprising:
   an analog to digital converter (ADC), arranged for monitoring a temperature of a battery and converting the monitored temperature to a digital value; and
   a control unit, coupled to the analog to digital converter, arranged for determining whether to generate a control signal to adjust a charge current or a charge voltage of a battery or not according to the digital value,
   wherein the power management integrated circuit is arranged such that, when the battery starts to be charged, a plurality of threshold values are loaded,
   wherein the control unit is arranged for determining whether to generate the control signal or not by comparing the digital value with at least one of the threshold values, and
   wherein the ADC is arranged for monitoring the temperature of the battery a plurality of times to generate a plurality of digital values, respectively, and the control unit is further arranged for generating the control signal to adjust the charge current or the charge voltage of the battery in response to determining that all digital values are greater than one of the threshold values or that all the digital values are smaller than one of the threshold values.

5. The power management integrated circuit of claim 4, further comprising:
   a terminal, arranged for connecting to a negative temperature coefficient (NTC) thermistor of the battery;
   wherein the ADC is arranged for monitoring the battery temperature by measuring a voltage level of the terminal.

6. The power management integrated circuit of claim 4, wherein the control unit is arranged such that, when the control unit determines to generate the control signal to adjust the charge current or the charge voltage of the battery, a signal to notify a processor is sent.

7. A charge control method, comprising:
   using a fully hardware architectures to:
   monitor a temperature of a battery and perform an analog to digital converting operation upon the monitored temperature to a digital value;
   determine whether to generate a control signal to adjust a charge current or a charge voltage of a battery or not according to the digital value; and
   when the battery starts to be charged, load a plurality of threshold values,
   wherein the fully hardware architecture is arranged for determining whether to generate the control signal to adjust the charge current or the charge voltage of the battery or not according to the digital value at least in part by:
      monitoring the temperature of the battery a plurality of times to generate a plurality of digital values, respectively; and
      generating the control signal to adjust the charge current or the charge voltage of the battery in response to determining that all digital values are greater than one of the threshold values or that all the digital values are smaller than one of the threshold values.

8. The charge control method of claim 7, wherein the step of monitoring the temperature of the battery and perform the analog to digital converting operation upon the monitored temperature to the digital value comprises:
   monitoring the temperature by measuring a voltage level of a terminal, and the terminal is arranged for connecting to a negative temperature coefficient (NTC) thermistor of the battery.

9. The charge control method of claim 7, further comprising:
   when it is determined to generate the control signal to adjust the charge current or the charge voltage of the battery, sending a signal to notify a processor.

10. The charge control circuit of claim 1, wherein the battery is a lithium-ion battery.

11. The charge control circuit of claim 1, wherein the charge control circuit is part of a portable device and comprises a baseband processor.

12. The power management integrated circuit of claim 4, wherein the battery is a lithium-ion battery.

13. The power management integrated circuit of claim 4, wherein the power management integrated circuit is part of a portable device and comprises a baseband processor.

14. The charge control method of claim 7, wherein the battery is a lithium-ion battery.

* * * * *